(12) United States Patent
Choi et al.

(10) Patent No.: US 11,862,799 B2
(45) Date of Patent: Jan. 2, 2024

(54) ANODE ACTIVE MATERIAL FOR SECONDARY BATTERY, ANODE COMPRISING SAME, AND METHOD FOR MANUFACTURING SAME

(71) Applicant: LG CHEM, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 522 days.

(21) Appl. No.: 17/049,471

(22) PCT Filed: Dec. 10, 2019

(86) PCT No.: PCT/KR2019/017411
§ 371 (c)(1),
(2) Date: Oct. 21, 2020

(87) PCT Pub. No.: WO2020/130465
PCT Pub. Date: Jun. 25, 2020

(65) Prior Publication Data
US 2021/0265630 A1    Aug. 26, 2021

(30) Foreign Application Priority Data

Dec. 17, 2018  (KR) .......................... 10-2018-0163075

(51) Int. Cl.
*H01M 4/587*    (2010.01)
*H01M 4/133*    (2010.01)
(Continued)

(52) U.S. Cl.
CPC .......... *H01M 4/587* (2013.01); *H01M 4/133* (2013.01); *H01M 10/0525* (2013.01); *H01M 2004/021* (2013.01); *H01M 2004/027* (2013.01)

(58) Field of Classification Search
CPC ........... H01M 4/133; H01M 2004/027; H01M 2004/021
See application file for complete search history.

(56) References Cited

U.S. PATENT DOCUMENTS 7,052,803 B2 *    5/2006    Kato ..................... H01M 4/133
                                                                  429/217
10,693,140 B2    6/2020    Piao et al.
(Continued)

FOREIGN PATENT DOCUMENTS

CN    1481041 A    3/2004
CN    1808745 A    7/2006
(Continued)

OTHER PUBLICATIONS

International Search Report for PCT/KR2019/017411 dated Apr. 3, 2020.
(Continued)

*Primary Examiner* — Brian R Ohara
*Assistant Examiner* — Michelle T Leonard
(74) *Attorney, Agent, or Firm* — Birch, Stewart, Kolasch & Birch, LLP

(57) ABSTRACT

An anode active material for a secondary battery that has improved cycle swelling properties and rapid charge performance, an anode comprising same, and a method for manufacturing same. The anode active material is a mixture of artificial graphite and spherical natural graphite, wherein the
(Continued)

spherical natural graphite has an average particle diameter (D 50) of 12 μm or less, with D 90-D 10 value ranging from 5 μm to 12 μm.

7 Claims, 1 Drawing Sheet

(51) Int. Cl.
*H01M 10/0525* (2010.01)
*H01M 4/02* (2006.01)

(56) References Cited

U.S. PATENT DOCUMENTS

| | | | |
|---|---|---|---|
| 2010/0297500 | A1 | 11/2010 | Kawai et al. |
| 2012/0052393 | A1* | 3/2012 | Kameda ............... H01M 4/364 429/231.8 |
| 2012/0070733 | A1* | 3/2012 | Yamada ............... H01M 4/133 429/211 |
| 2014/0093781 | A1* | 4/2014 | Nishihara ............ H01M 4/587 429/231.8 |
| 2015/0255828 | A1* | 9/2015 | Momo ............... H01M 10/0585 429/231.95 |
| 2016/0181612 | A1 | 6/2016 | Lee et al. |
| 2017/0179487 | A1* | 6/2017 | Takeda ................... C01B 32/20 |
| 2017/0187064 | A1* | 6/2017 | Takeda ................. H01M 4/364 |
| 2018/0342755 | A1 | 11/2018 | Yoon et al. |
| 2019/0273248 | A1 | 9/2019 | Yamada et al. |
| 2019/0305308 | A1 | 10/2019 | Lee et al. |
| 2019/0386307 | A1 | 12/2019 | Choi et al. |
| 2020/0127289 | A1 | 4/2020 | Kim et al. |

FOREIGN PATENT DOCUMENTS

| | | |
|---|---|---|
| CN | 102362381 A | 2/2012 |
| CN | 106463727 A | 2/2017 |
| CN | 110024189 A | 7/2019 |
| EP | 2 413 403 A1 | 2/2012 |
| JP | 2003-323895 A | 11/2003 |
| JP | 2007-324067 A | 12/2007 |
| JP | 2010-251315 A | 11/2010 |
| JP | 2013-196842 A | 9/2013 |
| JP | 2013-197082 A | 9/2013 |
| JP | 2016-532241 A | 10/2016 |
| KR | 10-2004-0012541 A | 2/2004 |
| KR | 10-2013-0136934 A | 12/2013 |
| KR | 10-2015-0027167 A | 3/2015 |
| KR | 10-2015-0073107 A | 6/2015 |
| KR | 10-2016-0084600 A | 7/2016 |
| KR | 10-2017-0007140 A | 1/2017 |
| KR | 10-2017-0093754 A | 8/2017 |
| KR | 10-2018-0029919 A | 3/2018 |
| KR | 10-2018-0035693 A | 4/2018 |
| KR | 10-2018-0085928 A | 7/2018 |
| KR | 10-2018-0130182 A | 12/2018 |
| WO | WO 2018/097212 A1 | 5/2018 |
| WO | WO 2018/135848 A1 | 7/2018 |

OTHER PUBLICATIONS

European Patent Office Search Report dated Jun. 21, 2021 for corresponding EP Application No. 19900749.3.
Korean Office Action for Korean Application No. 10-2018-0163075, dated Aug. 3, 2021, with English translation.
Japanese Notice of Reasons for Refusal for Japanese Application No. 2020-556252, dated Nov. 15, 2021, with an English translation.
Chinese Office Action and Search Report dated Aug. 4, 2023 for Application No. 201980025262.4 with a partial English translation.

* cited by examiner

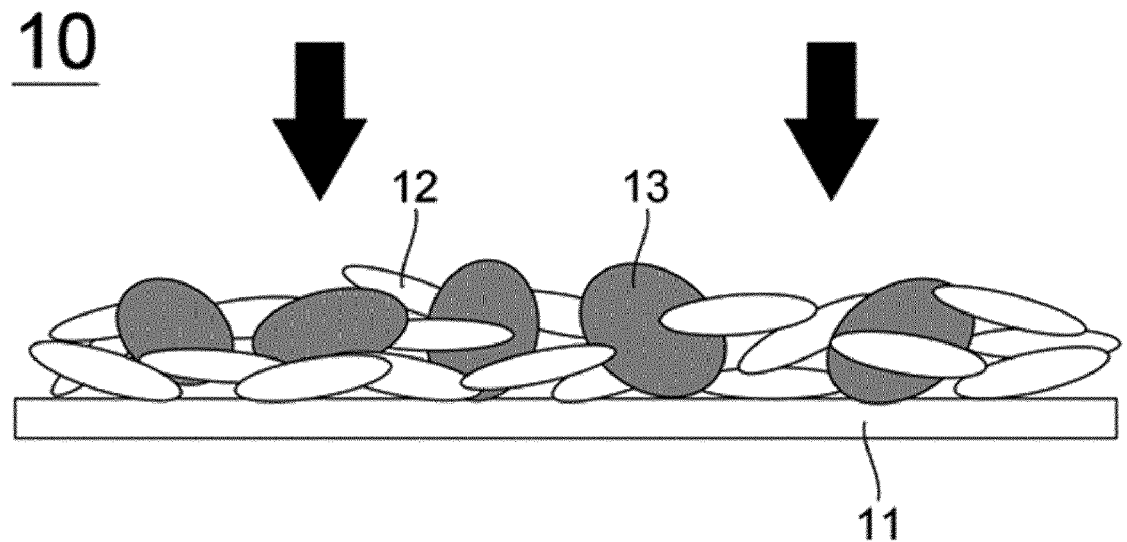

ANODE ACTIVE MATERIAL FOR SECONDARY BATTERY, ANODE COMPRISING SAME, AND METHOD FOR MANUFACTURING SAME

TECHNICAL FIELD

This application claims the benefit of priority based on Korean Patent Application No. 10-2018-0163075, filed on Dec. 17, 2018, and the entire contents of the Korean patent application are incorporated herein by reference.

The present invention relates to a negative electrode active material for a secondary battery, a negative electrode including the same and a method for manufacturing the same. More specifically, the present invention relates to a negative electrode active material having improved cycle swelling and high rate filling properties, a negative electrode, and a method for manufacturing the same.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separator is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

Among them, in the case of the negative electrode, in the related art, lithium metal was used as a negative electrode in the secondary battery. However, as the short circuit of the battery due to the formation of dendrites and the risk of explosion caused by this are known, lithium metal is being replaced with a carbon-based compound capable of reversible intercalation and desorption of lithium ions while maintaining structural and electrical properties.

The carbon-based compound has a very low discharge potential of about −3 V to the standard hydrogen electrode potential and exhibits excellent electrode life due to very reversible charge/discharge behavior due to the uniaxial orientation of the graphite layer. In addition, since the electrode potential during Li-ion charging is 0V Li/Li+ and can exhibit a potential almost similar to that of pure lithium metal, it has an advantage that higher energy can be obtained when constructing an oxide positive electrode and a battery.

The carbon-based compound includes crystalline carbon and amorphous carbon. Representative examples of crystalline carbon include graphite carbon such as natural graphite and artificial graphite, and examples of amorphous carbon include non-graphitizable carbons (hard carbons) obtained by carbonizing polymer resins, graphitizable carbons (soft carbons) obtained by heat treatment of pitch, etc.

In particular, as a carbon-based material, natural graphite with high capacity or excellent artificial graphite having high temperature characteristics is used. However, artificial graphite has a lower capacity than natural graphite, has a poor processability such as a decrease in the production of negative electrode slurry and the decrease in electrode adhesion due to secondary granulation and coating treatment, and has low electrode rolling properties. In addition, in the case of natural graphite, the swelling phenomenon according to the high degree of orientation or rapid charging performance is inferior and is not good in the high temperature characteristics due to relatively many functional groups on the surface compared to the artificial graphite.

Korean Patent Publication No. 10-2015-0073107 discloses that natural graphite and artificial graphite are mixed as the carbon-based negative electrode active material, and the artificial graphite is mosaic coke-based artificial graphite. However, when using natural graphite as described above, the mechanical strength of the electrode becomes weak, and the cycle swelling and rapid charging performance during charging and discharging are poor. In this case, during charging and discharging, the electrode may swell, resulting in problems such as reduced cycle life.

Therefore, there is a need for technology development for solving the problem.

DISCLOSURE

Technical Problem

The present invention was devised to solve the above problems, and an object of the present invention is to provide a negative electrode active material using a mixture of natural graphite and artificial graphite, in which the cycle characteristics, swelling characteristics and rapid charging performance are improved to the level of artificial graphite even when using natural graphite, by using spheroidized natural graphite with small particle size and uniform particle size distribution, and a negative electrode including the same and its manufacturing method.

Technical Solution

A negative electrode active material for a secondary battery according to the present invention may be a mixture of artificial graphite and spheroidized natural graphite, and the spheroidized natural graphite may have an average particle diameter ($D_{50}$) of 12 μm or less, and $D_{90}$–$D_{10}$ value may be 5 to 12 μm.

In addition, in the negative electrode active material for a secondary battery according to the present invention, the artificial graphite of 65 to 85% by weight based on the total weight of the negative electrode active material may be contained in the negative electrode active material, and the spheroidized natural graphite of 15 to 35% by weight based on the total weight of the negative electrode active material may be contained in the negative electrode active material.

In addition, in the negative electrode active material for a secondary battery according to the present invention, the average particle diameter ($D_{50}$) of the natural graphite may be 9 to 11 μm.

In addition, in the negative electrode active material for a secondary battery according to the present invention, $D_{90}$–$D_{10}$ value of the natural graphite may be 7 to 9 μm.

In addition, in the negative electrode active material for a secondary battery according to the present invention, a tap density of the natural graphite may be 1.10 to 1.25 g/cc.

In addition, in the negative electrode active material for a secondary battery according to the present invention, the natural graphite may have an adhesive force to the current collector of 20 to 35 gf/cm after rolling.

In addition, in the negative electrode active material for a secondary battery according to the present invention, the artificial graphite may be a pitch coke produced by heat treating coal tar, coal tar pitch, petroleum pitch or heavy oil.

In addition, in the negative electrode active material for a secondary battery according to the present invention, the spheroidized natural graphite may be obtained by a process in which a natural scaly graphite is treated with an acid or a base, and is then spheroidized for 10 minutes to 30 minutes at a rotor speed of 30 m/s to 100 m/s in a spheroidizing device.

In addition, the present invention provides a negative electrode for a secondary battery, in which the negative electrode includes a current collector; and a negative electrode mixture layer coated on the current collector, and the negative electrode mixture layer includes a conductive material, a binder, and the negative electrode active material.

In addition, the present invention provides a method for manufacturing a negative electrode for a secondary battery. The method for manufacturing a negative electrode for a secondary battery includes preparing a negative electrode mixture and applying the negative electrode mixture onto a current collector, followed by drying. The negative electrode active material included in the negative electrode mixture includes a mixture of artificial graphite and spheroidized natural graphite.

The negative electrode active material is as described above.

Advantageous Effects

According to the present invention, it is possible to improve cell performance such as cycle characteristics, swelling characteristics, and rapid charging by using a negative electrode active material mixed with artificial graphite and spheroidized natural graphite having a small particle size and uniform particle size.

BRIEF DESCRIPTION OF THE DRAWINGS

The FIGURE is a schematic diagram showing the structure of a negative electrode for a secondary battery including a negative electrode active material according to the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

The negative electrode active material for a secondary battery according to the present invention includes a graphite material as a main component.

Specifically, the negative electrode active material is a mixture of artificial graphite and spheroidized natural graphite. In general, artificial graphite has excellent high temperature properties, but has a problem of exhibiting low capacity and low processability, and thus it is possible to improve the capacity of the active material by mixing natural graphite with excellent initial discharge capacity. However, as the natural graphite charge/discharge cycle is repeated, a swelling phenomenon may occur due to an electrolyte decomposition reaction occurring at the edge portion of the natural graphite, and charge/discharge efficiency and capacity may decrease. In addition, natural graphite has a problem in that there are many internal pores, and when the electrode is rolled, the internal pores are clogged and subject to mechanical stress.

Therefore, as will be described later, as a mixture of spheroidized natural graphite with a small particle size and uniform particle size is mixed with artificial graphite, it is possible to improve low cycle characteristics, swelling characteristics, and rapid charging characteristics, which were disadvantages of conventional natural graphite, while retaining the advantages of artificial graphite and natural graphite.

Specifically, the spheroidized natural graphite may have an average particle diameter ($D_{50}$) of 12 μm or less, more preferably 9 to 11 μm in view of the initial efficiency of the secondary battery. By using spheroidized natural graphite having an average particle diameter within the above range, it is possible to obtain an advantage of improving the rapid charging ability at a high energy density. When the average particle diameter of the spheroidized natural graphite exceeds 12 μm, as described below, the tap density of the negative electrode and the adhesion property of the active material decrease, thereby reducing the effect of improving the swelling phenomenon of the electrode. Charging and discharging performance of the secondary battery may be reduced.

In addition, according to the present invention, in order to improve performance degradation that may occur when using natural graphite, the particle size distribution should be uniform, and in the particle size distribution of the spheroidized natural graphite, the $D_{90}-D_{10}$ value may be 5 to 12 μm, and preferably 7 to 9 μm. Here, $D_{90}$ is a particle size in which the accumulation becomes 90% from the smallest particle in the order of particle diameter, $D_{10}$ is a particle diameter in which the accumulation becomes 10% from the smallest particle in the particle size order, and $D_{50}$ is a particle size in which the accumulation becomes 50% from the smallest particle in the order of particle size. The smaller the $D_{90}-D_{10}$ value, the sharper the particle size distribution curve. When the $D_{90}-D_{10}$ is less than 5 μm, rapid charging characteristics may deteriorate, and when the $D_{90}-D_{10}$ exceeds 12 μm, a problem that it is difficult to obtain an appropriate density may occur. That is, when the $D_{90}-D_{10}$ is out of the above range, a problem in which the active material tap density becomes too low occurs, and the electrode active material layer becomes thicker and the pressability is lowered, so it becomes difficult to implement high energy density.

The particle size of the spheroidized natural graphite can be measured, for example, by using a laser diffraction method. The laser diffraction method can generally measure a particle diameter of several mm from a submicron region, and can obtain results of high reproducibility and high resolution. More specifically, the particle size of the spheroidized natural graphite may be performed as follows. After dispersing the spheroidized natural graphite in a solution of ethanol/water, it may be introduced into a commercially available laser diffraction particle size measuring device (e.g., Microtrac MT 3000) and irradiated with an output power of 60 W of ultrasonic waves of about 28 kHz, and then the particle size of the spheroidized natural graphite may be calculated based on the particle size distribution in the measuring device.

Further, the spheroidized natural graphite can be obtained by applying a mechanical external force to general natural graphite and performing the granulated spheroidization treatment. For example, the spheroidized natural graphite is treated with an acid or a base for scaly natural graphite, and then spheroidized for 10 minutes to 30 minutes at a rotor speed of 30 m/s to 100 m/s in a spheroidizing device, but not limited thereto.

The tap density of the spheroidized natural graphite may be 1.10 to 1.25 g/cc, more preferably 1.15 to 1.20 g/cc. The tap density of the active material is the apparent density of the powder obtained by vibrating the container under certain conditions when filling the powder. In the present invention, the tap density can be measured after performing tapping 2000 times using TAP-2S, manufactured by LOGAN, a tap density meter.

The higher the tap density, the higher the packing density of the electrode. Specifically, after mixing the active material with a binder or conductive material for electrode production, it is coated on the current collector in a thin film, and is then pressed to harden the electrode. At this time, if the filling is not good, the electrode cannot be made thin, and since it occupies a large volume, it is impossible to realize a high capacity in a given battery volume condition.

The tap density of the spheroidized natural graphite is affected by the particle diameter of the natural graphite, and the tap density may decrease as the particle size of natural graphite increases, and the tap density may increase as the particle size of natural graphite decreases. In general, in order to improve the adhesion between the active material and the electrode current collector, it is preferable to have a large tap density because the adhesion area is increased when the contact area between the particles is increased, thereby improving the adhesion.

When the tap density of the spheroidized natural graphite is less than 1.10 g/cc, the contact area between the particles may not be sufficient, and thus adhesive properties may be deteriorated, and energy density per unit volume may be reduced. On the other hand, when the tap density of the spheroidized natural graphite exceeds 1.25 g/cc, the tortuosity of the electrode and the wettability of the electrolyte decrease, resulting in a decrease in output characteristics during charging and discharging and causing a reduction in initial efficiency and deterioration of high temperature properties.

In addition, in the negative electrode active material according to the present invention, the degree of spheroidization of the spheroidized natural graphite may be 0.94 to 0.98, specifically 0.95 to 0.96. The spheronization degree may mean a shorter diameter than a long diameter of the first particles. The spheronization degree can be measured through a particle shape analyzer. Specifically, after deriving the cumulative distribution of the spheroidization degree of the spheroidized natural graphite particles through a particle shape analyzer, the degree of spheroidization, in which the distribution ratio from particles with a large degree of spheroidization corresponds to 50%, can be determined as the degree of spheroidization of the first particle.

When the spheroidization degree of the spheroidized natural graphite particles is less than 0.94, a problem of low electrode adhesion may be caused by an excessively curved surface of the first particles. In addition, when the degree of spheroidization of the spheroidized natural graphite particles is greater than 0.98, a large amount of spheroidized natural graphite particles is required to derive a high degree of spheroidization, which may cause a problem of low production yield.

In addition, in the negative electrode active material according to the present invention, the adhesion to the current collector after rolling of the spheroidized natural graphite may be 20 to 35 gf/cm, more preferably 25 to 30 gf/cm. In general, natural graphite exhibits excellent adhesion to the current collector compared to artificial graphite with a small amount of functional groups or defects on the surface due to the presence of functional groups on the surface. Hence, when the adhesion to the current collector after rolling of the spheroidized natural graphite is within the above range, the adhesion of the negative electrode active material mixed with artificial graphite to the current collector may be improved afterwards.

The adhesion of the spheroidized natural graphite to the current collector may be influenced by particle size, and the larger the particle diameter, the smaller the surface area and the smaller the adhesion to the current collector. When the adhesion of the spheroidized natural graphite to the current collector is less than 20 gf/cm, the capacity of the battery may rapidly decrease as the negative electrode active material is easily peeled off from the current collector. On the other hand, when the electrode adhesion exceeds 35 gf/cm, fast charging characteristics may deteriorate due to an increase in electrode resistance.

Next, the artificial graphite used in the present invention will be described.

In the negative electrode active material for a secondary battery according to the present invention, artificial graphite contained in the negative electrode active material may be prepared using a carbon precursor such as pitch coke, and the pitch coke can be produced using carbon precursors such as coal tar, coal tar pitch, petroleum pitch or heavy oil. The cokes can be prepared by heat treatment (graphitization) at a temperature of 2800° C. to 3000° C. after being mechanically crushed and polished.

The artificial graphite is not limited, and may be in the form of powder, flake, block, plate, or rod. However, in order to exhibit the best output characteristics, the shorter the travel distance of lithium ions, the better. And in order to have a short moving distance in the direction of the electrode, it is preferable that the grain orientation of artificial graphite exhibits isotropy. Hence, a flake shape or a plate shape, and more specifically, a flake shape is preferable.

In addition, the tap density of the artificial graphite may be 0.80 to 1.00 g/cc, more preferably 0.85 to 0.95 g/cc. When the tap density of the artificial graphite particles is less than 0.80 g/cc, the contact area between the particles may not be sufficient, and thus adhesive properties may be deteriorated, and energy density per unit volume may be reduced. On the other hand, when the tap density of artificial graphite exceeds 1.00 g/cc, the tortuosity of the electrode and the wettability of the electrolyte decrease, resulting in a decrease in output characteristics during charging and discharging and causing a reduction in initial efficiency and deterioration of high temperature properties.

In addition, the average particle diameter ($D_{50}$) of the artificial graphite may be 9 to 30 μm, preferably 10 to 20 μm. When the average particle diameter of the artificial graphite is less than 9 μm, the initial efficiency of the secondary battery may decrease due to an increase in specific surface area, thereby deteriorating battery performance. On the other hand, when the average particle diameter of the artificial graphite exceeds 30 μm, electrode adhesion may decrease and cycle characteristics of the battery may decrease.

In particular, the average particle diameter ($D_{50}$) of the artificial graphite is 1 to 2 times, preferably 1.2 to 1.7 times the average particle diameter ($D_{50}$) of the spheroidized natural graphite. When the ratio of the average particle diameter of artificial graphite and the average particle diameter of spheroidized natural graphite is within the above range, the filling density of the active material in the electrode is improved, and the specific surface area of the active material can be reduced to prevent side reactions with the electrolyte.

When the ratio of the average particle diameter of the artificial graphite to the average particle diameter of the spheroidized natural graphite is outside the above-mentioned range, the size of either particle is enlarged, so that it becomes difficult for artificial graphite and spheroidized natural graphite to be uniformly distributed, and as a result, output characteristics of the battery may be deteriorated.

In addition, the artificial graphite of 65 to 85% by weight, more preferably 70 to 80% by weight, based on the total weight of the negative electrode active material may be contained in the negative electrode active material according to the present invention.

In addition, the spheroidized natural graphite may be included in 15 to 35% by weight based on the total weight of the negative electrode active material, preferably 20 to 30% by weight.

In the case that the content of the artificial graphite is less than 65% and the content of spheroidized natural graphite exceeds 35% in the negative electrode active material, the content of natural graphite is too large, and thus a side reaction with the electrolyte may occur at a high temperature, a swelling phenomenon may occur, mechanical properties of the electrode may be weakened due to internal pores, and rapid charging performance may decrease. Conversely, when the content of the artificial graphite exceeds 85% by weight and the content of the spheroidized natural graphite is less than 15%, the content of the artificial graphite is excessively large, so that the capacity of the battery decreases, the processability decreases, and the rolling characteristics fall.

In addition, when one of artificial graphite and spheroidized natural graphite is used too much, the pores in the negative electrode active material layer are excessively present due to the morphology of each particle, so filling between the artificial graphite and natural graphite is not smoothly performed. As a result, the adhesion between the particles in the negative electrode active material and the adhesion between the negative electrode active material and the current collector may become poor. When the amounts of the artificial graphite and the spheroidized natural graphite are adjusted in the above range, the pores in the negative electrode active material layer are reduced, and since the artificial graphite and the spheroidized natural graphite are smoothly interlocked with each other, electrode adhesion can be improved.

In addition, the negative electrode active material according to the present invention may further include an adhesive component that assists in the combination of artificial graphite and spheroidized natural graphite. The pressure-sensitive adhesive is a component that assists in combining spheroidized natural graphite and artificial graphite, and a hard carbon precursor, soft carbon precursor, or the like may be used, but is not limited thereto. When the negative electrode active material further contains the adhesive component in addition to artificial graphite and natural graphite, the adhesive may be included in 1 to 40% by weight. Sucrose, phenol resin, naphthalene resin, polyvinyl alcohol resin, furfuryl alcohol resin, polyacrylonitrile resin, polyamide resin, furan resin, cellulose resin, styrene resin, polyimide resin, epoxy resin, and vinyl chloride resin, etc. may be used as the hard carbon precursor, and coke, needle coke, polyvinyl chloride, mesophase pitch, tar, heavy oil, etc. may be used as the soft carbon.

The present invention also provides a negative electrode for a secondary battery containing the negative electrode active material.

The FIGURE is a schematic diagram showing the structure of a negative electrode for a secondary battery including a negative electrode active material according to the present invention.

Referring to the FIGURE, the negative electrode 10 may be prepared by applying a negative electrode mixture containing a negative electrode active material on the current collector 11 and the drying it, and the negative electrode mixture may optionally further include a binder, a conductive material, and a filling material, if necessary. At this time, as the negative electrode active material, a mixture of the aforementioned artificial graphite 12 and spheroidized natural graphite 13 may be used.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; metal powders such as carbon fluoride, aluminum and nickel powder; conductive whiskers such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The present invention also provides a secondary battery produced by the method. Specifically, the secondary battery includes at least two secondary battery electrodes manufactured by the present invention and has a structure in which the electrode assembly is embedded in the battery case, wherein the electrode assembly is wound with a separator interposed between the secondary battery electrodes and has a structure in which the electrode assembly is impregnated with a lithium salt-containing non-aqueous electrolyte. The electrode for the secondary battery may be a positive electrode and/or a negative electrode. At this time, the negative electrode described above may be used, and the negative electrode may be manufactured as a lithium secondary battery after being assembled as an electrode assembly and sealed in a battery case together with an electrolyte, followed by an activation process. The secondary battery may be a cylindrical battery, a prismatic battery, a pouch-type battery, or a coin-type battery, and the shape of the battery is not particularly limited.

The electrode assembly is not particularly limited as long as it has a structure made of a positive electrode and a negative electrode and a separator interposed therebetween, for example, a folding structure, or a stacked structure, or a stack/folding type (SNF) structure, or lamination/stack-type (LNS) structure.

The folding-type electrode assembly includes at least one positive electrode, at least one negative electrode, and at least one separator interposed between the positive electrode and the negative electrode and the positive electrode, the separator, and the negative electrode may have a structure in which one end and the other end do not cross each other.

Further, the stack-type electrode assembly includes at least one positive electrode, at least one negative electrode, and at least one separator interposed between the positive electrode and the negative electrode and the positive electrode, the separator, and the negative electrode may have a structure in which one end and the other end cross each other.

The stack/folding-type electrode assembly includes at least one positive electrode, at least one negative electrode, and at least one separator interposed between the positive electrode and the negative electrode, and the separator includes a first separator and a second separator. Further, the positive electrode, the first separator, and the negative electrode may have a structure in which one end and the other end do not cross each other. The second separator may have a structure surrounding an electrode side on which an electrode tab is not formed.

The electrode assembly of the lamination-stack structure may include one or more improved electrodes having a laminate laminated on one or both surfaces thereof. The improved electrode, for example, may be implemented in a structure in which the separator is bonded to one surface of the positive electrode or the negative electrode. In addition, the separator may be implemented in a structure that is bonded to both sides of the positive electrode or both sides of the negative electrode. In addition, the positive electrode, the separator and the negative electrode may be implemented in a structure that are bonded to each other in a state where the separator is interposed between the positive electrode and the negative electrode.

In the secondary battery according to the present invention, the positive electrode may be prepared by applying an electrode mixture containing a positive electrode active material on a current collector and drying it, and the positive electrode mixture may optionally further include a binder, a conductive material, a filler, and the like, if necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-c)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or CO; olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

In the positive electrode, additive materials such as a binder, a conductive material, and a filling material are as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxy ethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, LiI, $Li_5NI_2$, $Li_3N$—LiT-LiOH, $LiSiO_4$, $LiSiO_4$—LiT-LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiBi_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

The method for preparing a negative electrode of the present invention includes preparing a negative electrode mixture and applying the negative electrode mixture on a current collector and then drying it.

In addition, the negative electrode active material included in the negative electrode mixture includes a mixture of artificial graphite and spheroidized natural graphite.

Specifically, the negative electrode active material described above may be used.

More specifically, in the method of manufacturing the negative electrode, preparing the negative electrode mixture may include spheronizing natural graphite; preparing artificial graphite; and mixing the spheroidized natural graphite and artificial graphite.

The step of spheronizing the natural graphite is a step of spheronizing by applying a mechanical external force to general scaly natural graphite. As described above, it can be obtained by treating scaly natural graphite with an acid or a base and then spheronizing at a rotor speed of 30 m/s to 100 m/s in a spheronizing device for 10 to 30 minutes.

Preparing the artificial graphite may include: preparing a pitch coke by coking a carbon precursor such as coal tar, coal tar pitch, petroleum pitch or heavy oil; and mechanically crushing and polishing the pitch coke and then heat treating the pitch coke (graphitization) at a temperature of 2800° C. to 3000° C.

In addition, spheronizing the natural graphite and preparing artificial graphite may further include classifying the spheroidized natural graphite and artificial graphite particles so that the particle size distribution becomes uniform.

Through the classifying step, the average particle diameter (D50) of the spheroidized natural graphite and artificial graphite can be adjusted according to the above numerical values, and in particular, the $D_{90}-D_{10}$ value may be adjusted to 5 to 12 μm, preferably 7 to 9 μm, through the classification step.

The classification process may be carried out by any method, but it is appropriate to perform it by an air flow classification process. In the case of performing the air flow classification process, the conditions of the air flow classification process can be appropriately adjusted according to the type of the active material.

When spheroidized natural graphite and artificial graphite are prepared, the spheroidized natural graphite and artificial graphite are mixed, and the mixing method is not particularly limited. For example, one having a high-speed chopper such as a Henschel mixer or a Spartan Luther, or a Nauter mixer or a ribbon mixer can be used for uniform mixing at high speed.

The spheroidized natural graphite and artificial graphite are mixed, a binder and a conductive material are added, and a solvent such as water is added thereto to prepare a negative electrode mixture slurry. If necessary, a thickener such as carboxymethylcellulose (CMC) may be further included.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Preparation of Negative Electrode

A negative electrode was prepared using a negative electrode active material containing 80% by weight of artificial graphite and 20% by weight of spheroidized natural graphite. Specifically, natural graphite having a small particle size and uniform particle size was used for the negative electrode active material, and the natural graphite had an average particle diameter ($D_{50}$) of 11 μm in a particle size distribution, $D_{90}$ of 15 μm, $D_{10}$ of 6 μm, and $D_{90}-D_{10}$ of 9 μm. Further, the tap density of the spheroidized natural graphite was 1.15 g/cc (measured by performing 2000 tappings using TAP-2S, manufactured by LOGAN, a tap density measuring instrument), and the electrode adhesive force was 25 gf/cm after rolling. As the artificial graphite, flake-like artificial graphite (tap density: 0.90 g/cc) having an average particle diameter (D50) of 15.5 μm was used.

The natural graphite used as a negative electrode active material, SuperC65 used as a conductive material, styrene butadiene high part (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 cm² in vacuum drying at about 130° C. for 10 hours was prepared. At this time, the loading of the negative electrode was prepared to be 3.61 mAh/cm².

Preparation of Battery Cells

The negative electrode active material was coated on a copper foil to prepare a negative electrode so that the loading amount was 3.61 mAh/cm² in an area of 1.7671 cm². Further, a positive electrode mixture containing $LiCoO_2$ (LCO) as a positive electrode active material was applied to the aluminum foil to prepare a 1.4875 cm² counter electrode. An electrode assembly was manufactured by interposing a polyethylene separator between the working electrode and the counter electrode. Then, 1M $LiPF_6$ was added to a solvent in which 0.5 wt % of the non-aqueous electrolyte additive VC, which was generated by mixing ethylene carbonate (EC) with diethyl carbonate (EMC) in a volume ratio of 1:4, to thereby prepare a non-aqueous electrolyte solution, which was then injected into the electrode assembly. The electrode assembly was put in a case to produce a coin-type full-cell secondary battery.

In addition, the negative electrode active material was coated on a copper foil to prepare a working electrode (negative electrode) so that the loading amount was 3.61 mAh/cm² in an area of 1.4875 cm², and lithium metal having an area of 1.7671 cm² was used as a counter electrode (positive electrode). An electrode assembly was manufactured by interposing a polyethylene separator between the working electrode and the counter electrode. Then, 1M $LiPF_6$ was added to a solvent in which 0.5 wt % of the non-aqueous electrolyte additive VC, which was generated by mixing ethylene carbonate (EC) with diethyl carbonate (EMC) in a volume ratio of 1:4, to thereby prepare a non-aqueous electrolyte solution, which was then injected into the electrode assembly. The electrode assembly was put in a case to produce a coin-type half-cell secondary battery.

Example 2

Preparation of Negative Electrode

A negative electrode was prepared using a negative electrode active material containing 80% by weight of artificial graphite and 20% by weight of spheroidized natural graphite. Specifically, natural graphite having a small particle size and uniform particle size was used for the negative electrode active material, and the natural graphite had an average particle diameter ($D_{50}$) of 9 μm in a particle size distribution, $D_{90}$ of 13 μm, $D_{10}$ of 6 μm, and $D_{90}-D_{10}$ of 7 μm. In addition, the tap density of the spheroidized natural graphite was 1.20 g/cc, and thus the electrode adhesion was 30 gf/cm after rolling. As the artificial graphite, flake-like artificial graphite (tap density: 0.93 g/cc) having an average particle diameter (D50) of 14.5 μm was used.

The natural graphite used as a negative electrode active material, SuperC65 used as a conductive material, styrene butadiene high part (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 cm$^2$ in vacuum drying at about 130° C. for 10 hours was prepared. At this time, the loading of the negative electrode was prepared to be 3.61 mAh/cm$^2$.

Preparation of Battery Cells

The negative electrode active material of Example 2 was used to prepare a battery (coin type full cell and half cell battery) in the same manner as in Example 1.

Example 3

A negative electrode and a battery (coin type full cell and half-cell battery) were prepared in the same manner as in Example 1 except that the negative electrode active material containing 85% by weight of the artificial graphite of Example 1 and 15% by weight of the spheroidized natural graphite of Example 1 was used.

Example 4

A negative electrode and a battery (coin type full cell and half-cell battery) were prepared in the same manner as in Example 1 except that the negative electrode active material containing 70% by weight of the artificial graphite of Example 1 and 30% by weight of the spheroidized natural graphite of Example 1 was used.

Example 5

A negative electrode and a battery (coin type full cell and half-cell battery) were prepared in the same manner as in Example 1 except that the negative electrode active material containing 65% by weight of the artificial graphite of Example 1 and 35% by weight of the spheroidized natural graphite of Example 1 was used.

Comparative Example 1

A negative electrode and a battery (coin type full cell and half-cell battery) were prepared in the same manner as in Example 1 except that the negative electrode active material containing 90% by weight of the artificial graphite of Example 1 and 10% by weight of the spheroidized natural graphite of Example 1 was used.

Comparative Example 2

A negative electrode and a battery (coin type full cell and half-cell battery) were prepared in the same manner as in Example 1 except that the negative electrode active material containing 60% by weight of the artificial graphite of Example 1 and 40% by weight of the spheroidized natural graphite of Example 1 was used.

Comparative Example 3

A negative electrode was prepared using a negative electrode active material containing 80% by weight of artificial graphite and 20% by weight of spheroidized natural graphite of Example 1. Specifically, natural graphite having a small particle size and uniform particle size was used for the negative electrode active material, and the natural graphite had an average particle diameter ($D_{50}$) of 15 μm in a particle size distribution, $D_{90}$ of 21 μm, $D_{10}$ of 7 μm, and $D_{90}$-$D_{10}$ of 14 μm. In addition, the tap density of the spheroidized natural graphite was 1.15 g/cc, and thus the electrode adhesion was 15 gf/cm after rolling.

A battery was manufactured in the same manner as in Example 1, except that a negative electrode and a coin-type full cell and a coin-type half-cell including the negative electrode were manufactured using the negative electrode active material.

Comparative Example 4

A negative electrode was prepared using a negative electrode active material containing 80% by weight of artificial graphite and 20% by weight of spheroidized natural graphite of Example 1. Specifically, natural graphite having a small particle size and uniform particle size was used for the negative electrode active material, and the natural graphite had an average particle diameter ($D_{50}$) of 17 μm in a particle size distribution, $D_{90}$ of 28 μm, $D_{10}$ of 10 μm, and $D_{90}$-$D_{10}$ of 18 μm. In addition, the tap density of the spheroidized natural graphite was 1.10 g/cc, and thus the electrode adhesion was 14 gf/cm after rolling.

A battery was manufactured in the same manner as in Example 1, except that a negative electrode and a coin-type full cell and a coin-type half-cell including the negative electrode were manufactured using the negative electrode active material.

Comparative Example 5

A negative electrode was prepared using a negative electrode active material containing 80% by weight of artificial graphite and 20% by weight of spheroidized natural graphite of Example 1. Specifically, natural graphite having a small particle size and uniform particle size was used for the negative electrode active material, and the natural graphite had an average particle diameter ($D_{50}$) of 11 μm in a particle size distribution, $D_{90}$ of 21 μm, $D_{10}$ of 6 μm, and $D_{90}$-$D_{10}$ of 15 μm. In addition, the tap density of the spheroidized natural graphite was 1.05 g/cc, and thus the electrode adhesion was 11 gf/cm after rolling.

A battery was manufactured in the same manner as in Example 1, except that a negative electrode and a coin-type full cell and a coin-type half-cell including the negative electrode were manufactured using the negative electrode active material.

Comparative Example 6

A negative electrode was prepared using a negative electrode active material containing 80% by weight of artificial graphite and 20% by weight of spheroidized natural graphite of Example 1. At this time, the spheroidized natural graphite was added with a binder in the step of granulating and spheroidizing the flaky graphite to act as an adhesive between the flakes. Specifically, natural graphite having a small particle size and uniform particle size was used for the negative electrode active material, and the natural graphite had an average particle diameter ($D_{50}$) of 14 μm in a particle size distribution, $D_{90}$ of 27 μm, $D_{10}$ of 8 μm, and $D_{90}$-$D_{10}$ of 19 μm. In addition, the tap density of the spheroidized natural graphite was 1.00 g/cc, and thus the electrode adhesion was 8 gf/cm after rolling.

A battery was manufactured in the same manner as in Example 1, except that a negative electrode and a coin-type full cell and a coin-type half-cell including the negative electrode were manufactured using the negative electrode active material.

Table 1 shows the contents of artificial graphite and spheroidized natural graphite used in Examples and Comparative Examples, and Table 2 shows the physical properties of natural graphite used in Examples and Comparative Examples.

TABLE 1

| Division | Artificial graphite content (w %) | Spheroidized natural graphite content (w %) |
| --- | --- | --- |
| Example 1 | 80 | 20 |
| Example 2 | 80 | 20 |
| Example 3 | 85 | 15 |
| Example 4 | 70 | 30 |
| Example 5 | 65 | 35 |
| Comparative Example 1 | 90 | 10 |
| Comparative Example 2 | 60 | 40 |
| Comparative Example 3 | 80 | 20 |
| Comparative Example 4 | 80 | 20 |
| Comparative Example 5 | 80 | 20 |
| Comparative Example 6 | 80 | 20 |

TABLE 2

| Division | $D_{50}(\mu m)$ | $D_{90}(\mu m)$ | $D_{10}(\mu m)$ | $D_{90-D10}(\mu m)$ | Tap density (g/cc) | Adhesion (gf/cm) |
| --- | --- | --- | --- | --- | --- | --- |
| Example 1 | 11 | 15 | 6 | 9 | 1.15 | 25 |
| Example 2 | 9 | 13 | 6 | 7 | 1.20 | 30 |
| Example 3 | 11 | 15 | 6 | 9 | 1.15 | 25 |
| Example 4 | 11 | 15 | 6 | 9 | 1.15 | 25 |
| Example 5 | 11 | 15 | 6 | 9 | 1.15 | 25 |
| Comparative Example 1 | 11 | 15 | 6 | 9 | 1.15 | 25 |
| Comparative Example 2 | 11 | 15 | 6 | 9 | 1.15 | 25 |
| Comparative Example 3 | 15 | 21 | 7 | 14 | 1.15 | 15 |
| Comparative Example 4 | 17 | 28 | 10 | 18 | 1.10 | 14 |
| Comparative Example 5 | 11 | 21 | 6 | 15 | 1.05 | 11 |
| Comparative Example 6 | 14 | 27 | 8 | 19 | 1.00 | 8 |

Experimental Example 1

In-Situ SAC Swelling Test

The charging range was determined to allow SOC to become from 0 to 95% by using the manufactured coin-type full cell, and the change in the thickness of the negative electrode during charging and discharging was expressed as a swelling ratio (%) while charging the first cycle at 0.1 C, the second cycle at 0.2 C, and the third to 30th cycles at 0.5 C. The results are shown in Table 3.

Experimental Example 2

Li-Plating Test

The half-cell was charged and discharged at 1 C for 3 cycles by using the prepared coin-type half-cell, and then charged at 3 C for 15 minutes to first differentiate the profile. At this time, the inflection point appearing in dQ/dV was checked to quantify lithium plating SOC (Li-Plating SOC, %), which is the SOC at the time of lithium precipitation on the negative electrode surface. The results are shown in Table 3.

Experimental Example 3

Peel Strength (Adhesion) Test of Negative Electrode

The negative electrode was rolled to 28% porosity to perform Peel Strength Test. At this time, by using the slide glass, the electrodes were directed at a 90-degree right angle direction, and the current collector was peeled off to measure electrode adhesion (peeling strength), and the results are shown in Table 3 below.

TABLE 3

| Division | Swelling Ratio (%) | Li-Plating SOC (%) | Electrode adhesion (gf/cm) |
| --- | --- | --- | --- |
| Example 1 | 20.1 | 41 | 25 |
| Example 2 | 21.2 | 38 | 30 |
| Example 3 | 22.3 | 40 | 20 |
| Example 4 | 24.8 | 38 | 17 |
| Example 5 | 25.2 | 37 | 22 |
| Comparative Example 1 | 27.4 | 32 | 18 |
| Comparative Example 2 | 27.9 | 28 | 23 |
| Comparative Example 3 | 28.3 | 32 | 15 |
| Comparative Example 4 | 29.5 | 31 | 14 |
| Comparative Example 5 | 26.8 | 34 | 11 |
| Comparative Example 6 | 30.6 | 30 | 8 |

As can be seen in Table 3, in Examples 1 and 2 of using the negative electrode active material according to the present invention, spherical natural graphite having a small particle size and a uniform particle size distribution was used. and as a result, the electrode adhesion between the active material and the current collector was improved compared to Comparative Examples 3 to 6 in which the particle size was large and the particle size distribution was not uniform, and accordingly, it can be confirmed that the swelling ratio is reduced and the cycle characteristics are improved.

And when comparing the ratio of the spheroidized natural graphite contained in the negative electrode active material of Example 1, Examples 3 to 5, Comparative Example 1 and Comparative Example 2, it can be seen that the swelling ratio and cycle characteristics of the negative electrode and the battery used in the above examples are improved compared to the comparative example.

In addition, it can be seen that when going beyond the tap density of the spheroidized natural graphite of the present invention and the electrode adhesion force range, the electrode adhesion to the current collector of the negative electrode active material is improved, and thus the swelling ratio is reduced and the cycle characteristics are improved.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

DESCRIPTION OF REFERENCE NUMERALS

10: negative electrode
11: current collector
12: artificial graphite
13: spheroidized natural graphite

The invention claimed is:

1. A negative electrode active material for a secondary battery,
wherein the negative electrode active material consists of a mixture of flake-like artificial graphite and spheroidized natural graphite,
wherein the spheroidized natural graphite has an average particle diameter ($D_{50}$) of 9 μm to 11 μm, and $D_{90}$–$D_{10}$ value is 7 μm to 9 μm, and
wherein the flake-like artificial graphite is present in the negative electrode active material in an amount of 65 to 85% by weight based on a total weight of the negative electrode active material, and the spheroidized natural graphite is present in the negative electrode active material in an amount of 15 to 35% by weight based on the total weight of the negative electrode active material.

2. The negative electrode active material of claim 1, wherein a tap density of the spheroidized natural graphite is 1.10 g/cc to 1.25 g/cc.

3. The negative electrode active material of claim 1, wherein the flake-like artificial graphite is a pitch coke produced by heat treating coal tar, coal tar pitch, petroleum pitch or heavy oil.

4. The negative electrode active material of claim 1, wherein the spheroidized natural graphite is obtained by a process of treating natural scaly graphite with an acid or a base, and is then spheroidizing for 10 minutes to 30 minutes at a rotor speed of 30 m/s to 100 m/s in a spheroidizing device.

5. A negative electrode for a secondary battery, the negative electrode comprising:
    a current collector; and
    a negative electrode mixture layer coated on the current collector,
    wherein the negative electrode mixture layer comprises a conductive material, a binder, and the negative electrode active material according to claim 1.

6. A secondary battery comprising:
    a negative electrode,
    a positive electrode,
    a separator interposed between the negative electrode and the positive electrode, and
    an electrolyte,
    wherein the negative electrode is the negative electrode of claim 5.

7. The negative electrode active material of claim 5, wherein the spheroidized natural graphite has an adhesive force to the current collector of 20 gf/cm to 35 gf/cm after rolling.

* * * * *